(12) United States Patent
Shrestha et al.

(10) Patent No.: US 11,080,389 B2
(45) Date of Patent: Aug. 3, 2021

(54) INTEGRATED SECURE PIN CONFERENCING SYSTEM

(71) Applicant: Bank of America Corporation, Charlotte, NC (US)

(72) Inventors: Ashish Shrestha, Jersey City, NJ (US); Kushalappa Berera Arun, Jersey City, NJ (US); Vinay Kanakath, Waxhaw, NC (US); Steven William Kuiken, Sherman Oaks, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 88 days.

(21) Appl. No.: 16/714,187

(22) Filed: Dec. 13, 2019

(65) Prior Publication Data
US 2021/0182376 A1 Jun. 17, 2021

(51) Int. Cl.
G06F 21/00 (2013.01)
G06F 21/45 (2013.01)
H04L 29/06 (2006.01)
H04L 29/08 (2006.01)

(52) U.S. Cl.
CPC ............ *G06F 21/45* (2013.01); *H04L 63/083* (2013.01); *H04L 63/102* (2013.01); *H04L 63/126* (2013.01); *H04L 65/403* (2013.01); *H04L 67/02* (2013.01)

(58) Field of Classification Search
CPC .............. H04L 12/1827; H04L 65/403; H04L 63/0861; H04L 65/1069; H04L 9/3226; H04L 63/08; H04L 63/10; H04L 12/1818; H04L 65/1006; H04L 63/065; H04M 3/56; H04M 2203/5054; H04M 2242/22; H04M 3/42059
See application file for complete search history.

(56) References Cited

U.S. PATENT DOCUMENTS

| | | |
|---|---|---|
| 6,563,914 B2 | 5/2003 | Sammon et al. |
| 6,798,753 B1 | 9/2004 | Doganata et al. |
| 7,010,107 B1 | 3/2006 | Lee et al. |
| 7,640,303 B2 | 12/2009 | Blumofe |
| 8,107,402 B1 * | 1/2012 | Everson .................. H04M 3/56 370/260 |
| 8,243,901 B2 | 8/2012 | Bostick et al. |
| 9,614,968 B2 | 4/2017 | Adderly et al. |
| 9,832,240 B2 | 11/2017 | Adderly et al. |
| 10,230,776 B2 | 3/2019 | Adderly et al. |
| 2002/0122391 A1 | 9/2002 | Shalit |
| 2004/0054724 A1 | 3/2004 | Sudo |

(Continued)

*Primary Examiner* — Chirag R Patel
(74) *Attorney, Agent, or Firm* — Michael A. Springs; Moore & Van Allen PLLC; Nicholas C. Russell

(57) ABSTRACT

Embodiments of the invention are directed to a system, method, or computer program product for secure remote conferencing. A platform is provided for generation of secure conference call information, scheduling and dissemination of secure conference call information, initiation and monitoring of live conference calls, tagged tracking of uniquely generated personal identification number (PIN) codes, and secure streaming of recorded conference calls. A host of a secure event conference may provide relevant information about the secure conference call event and pre-authorized attendees which the platform may then use to generate and monitor single-user PIN access for the secure conference call event.

20 Claims, 5 Drawing Sheets

(56) References Cited

U.S. PATENT DOCUMENTS

| | | |
|---|---|---|
| 2004/0234058 A1 | 11/2004 | Darby et al. |
| 2006/0088152 A1 | 4/2006 | Green et al. |
| 2007/0208806 A1* | 9/2007 | Mordecai ............... G06Q 10/10 |
| | | 709/204 |
| 2013/0058473 A1* | 3/2013 | de Jong ................ H04M 3/565 |
| | | 379/202.01 |
| 2013/0263216 A1* | 10/2013 | Vakil ....................... G06F 21/31 |
| | | 726/3 |

\* cited by examiner

INTEGRATED SECURE PIN CONFERENCING SYSTEM

BACKGROUND

Current solutions for remotely connecting users for conference communications lack functionality needed to screen for unauthorized access in a secure and dynamic fashion on a per-conference basis. As such, there is a need for integrated systems and methods to provide for enhanced security control with regard to accessing remote conference resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention provides a secure platform for customer generation and scheduling secure event conferencing by generation, deployment, and tagged tracking of personal identification numbers (PIN). A host of a security event conference may provide relevant information about the event, the system may generate a bullet with static text that provides instructions for PIN access to each participant of the event.

In some embodiments, the present invention receives a request to generate secure conference call information for a secure conference call, generates the secure conference call information for the secure conference call, wherein the secure conference call information comprises a conference call identification code and a list of single user PIN codes associated with the conference call identification code, generates a link to a secure web portal and transmit the link to a user, verifies that the user has accessed the secure web portal, upon verification that the user accessed the secure web portal, assigns one single user PIN code from the list of single user PIN codes to the user, and displays the assigned single user PIN code to the user via the secure web portal.

In some embodiments, the present invention displays additional information upon verification of the user via the secure web portal including conference call dial-in number conference call host, conference call time, conference call date, and conference call topic.

In some embodiments, the present invention initiates the secure conference call, upon one or more users dialing-in to the secure conference call, prompts the one or more users to enter single user PIN codes via a user device, verifies the entered single user PIN codes, connects the one or more users to the secure conference call, continuously monitors the one or more users connected to the secure conference call, and ensures that each single user PIN code is only used to connect one user at a time by rejecting simultaneous use of the same single user PIN code to connect multiple simultaneous users.

In some embodiments, the list of single user PIN codes associated with the conference call identification code are generated uniquely for the conference call identification code. In some embodiments, the request to generate secure conference call information further comprises user information for one or more users authorized to access the secure conference call and the system is further configured to assign single user PIN codes from the list of single user PIN codes to specific users prior to generating the link to the secure web portal.

In some embodiments, the present invention grants a first user device access to the secure conference call upon receiving a first single user PIN code from the first user device, deactivates the first single user PIN code, continuously monitors all devices connected the secure conference call, determines that the first user device has disconnected from the secure conference call, reactivates the first single user PIN code, and subsequently grant a second user device access to the secure conference call upon receiving the first single user PIN code from the second user device after the first single user PIN code has been reactivated.

In some embodiments, the present invention generates a recording of the secure conference call, generates a streaming link for remote access to the recording of the secure conference call via the secure web portal, and automatically forwards the streaming link to one or more users that received a single user PIN code.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
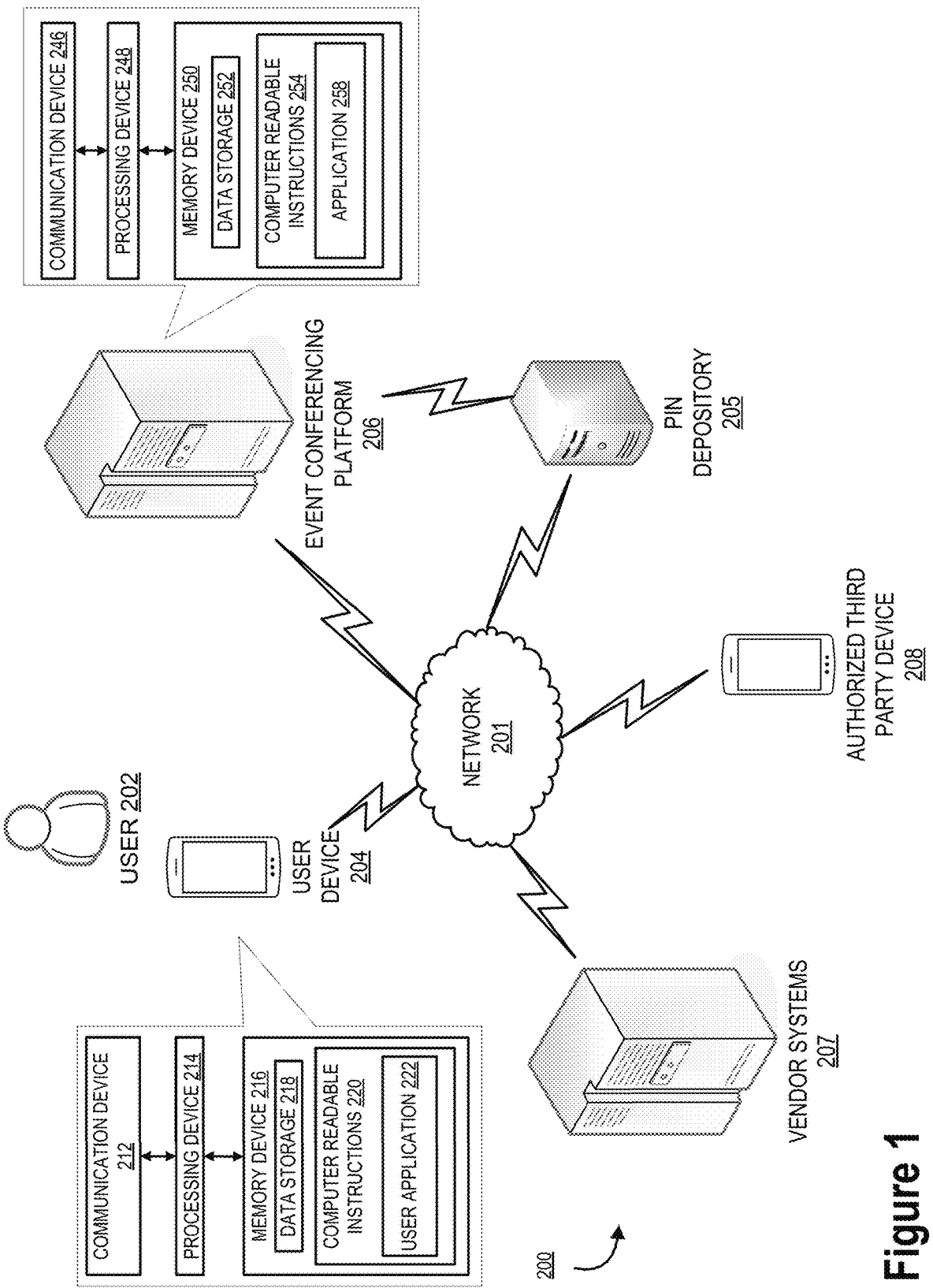
Figure 2A:
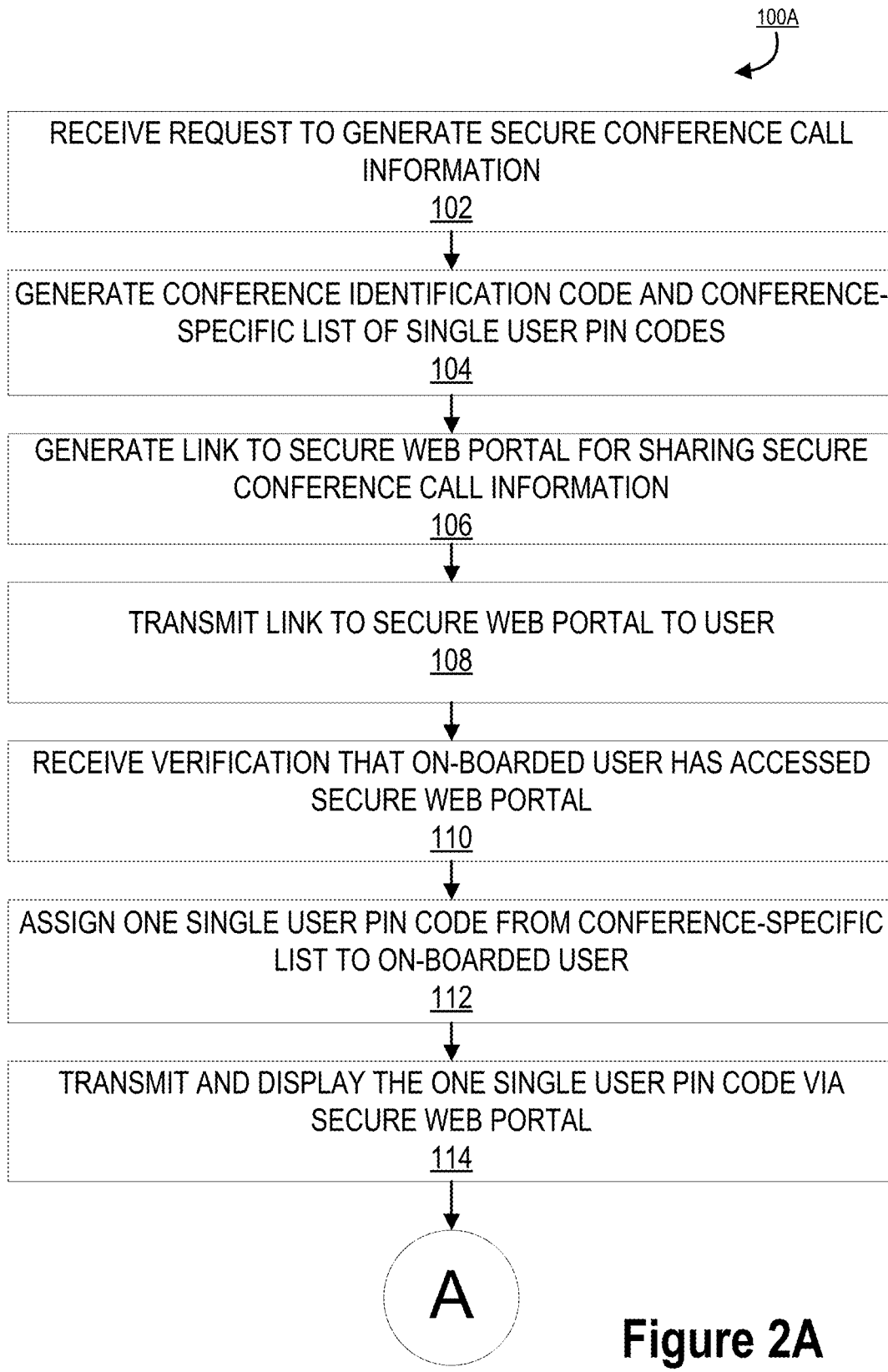
Figure 2B:
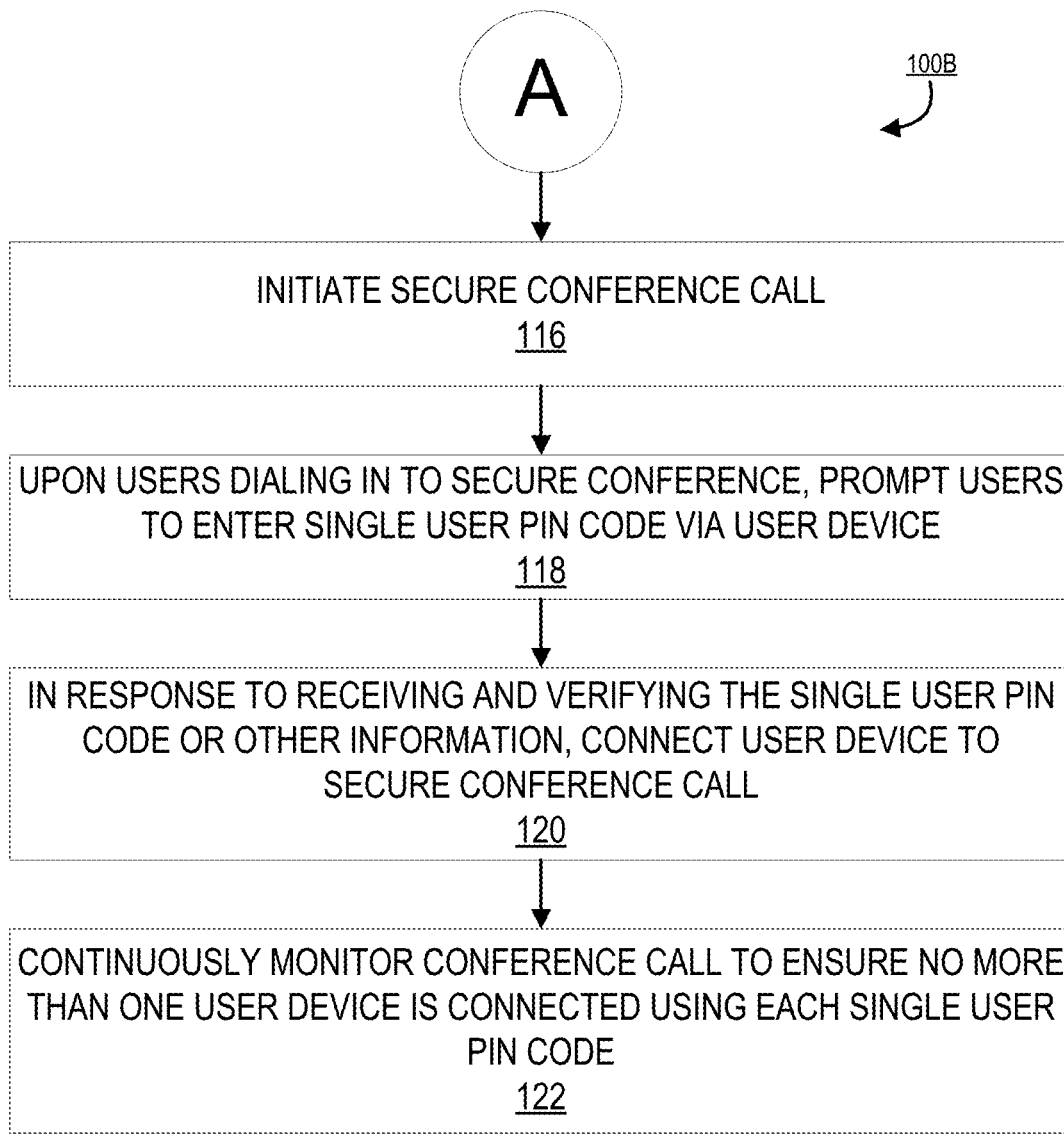
Figure 3:
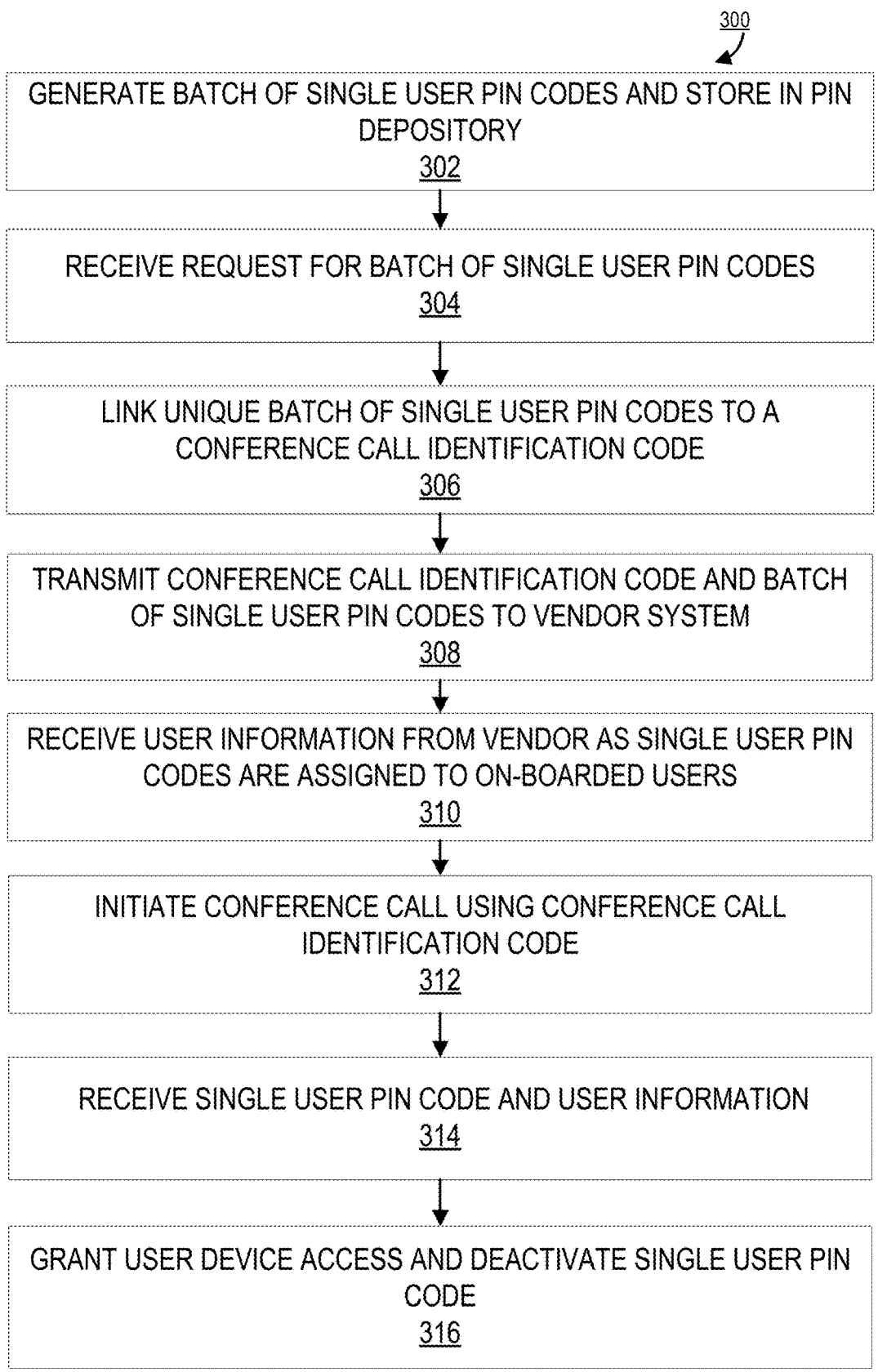
Figure 4:
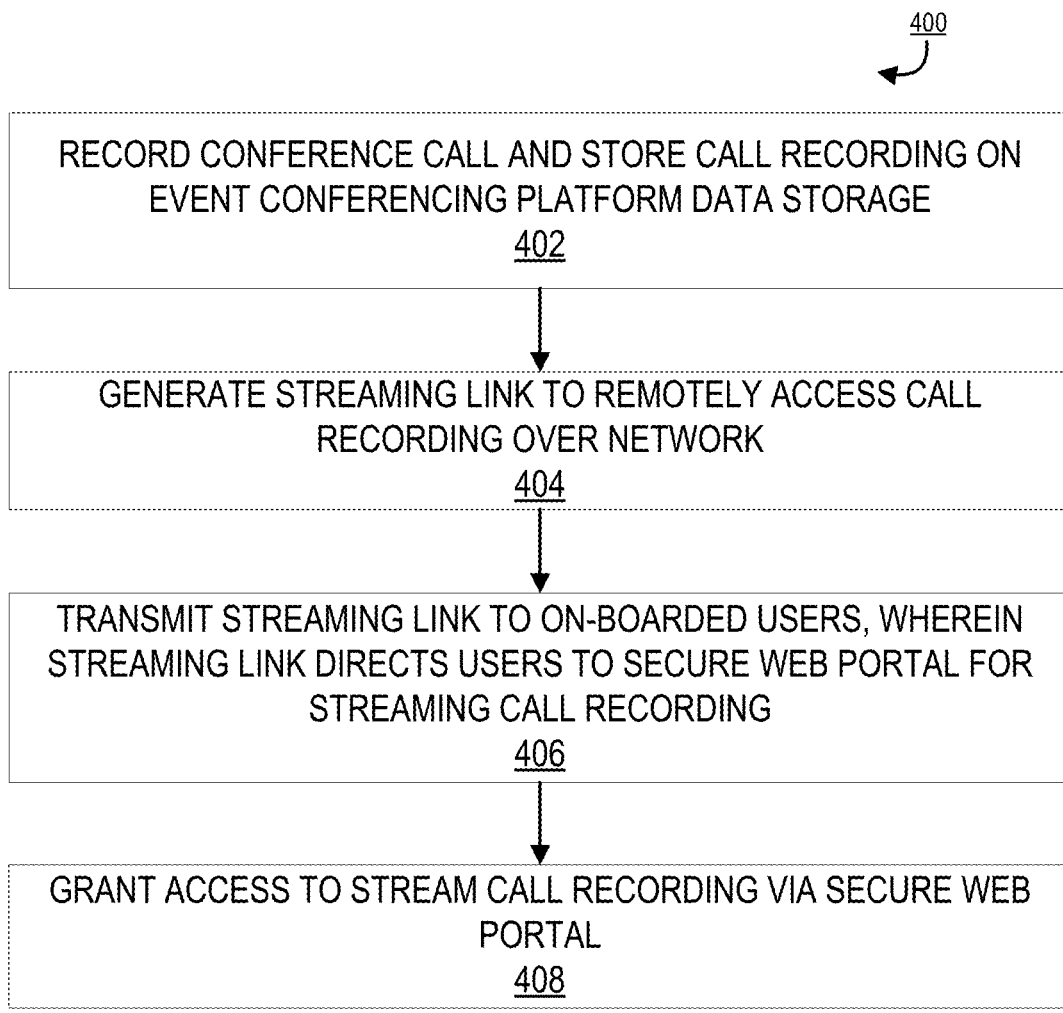

Having thus described embodiments of the invention in general terms, reference will now be made to the accompanying drawings, wherein:

FIG. 1 provides an integrated secure event conferencing system environment, in accordance with one embodiment of the present invention;

FIG. 2A provides a high level process flow illustrating generation and allocation of single user PIN codes, in accordance with one embodiment of the present invention;

FIG. 2B provides a process flow illustrating conference call implementation utilizing single user PIN codes, in accordance with one embodiment of the present invention;

FIG. 3 provides a process flow illustrating delivery of single user PIN codes and conference access monitoring, in accordance with one embodiment of the present invention; and FIG. 4 provides a process flow illustrating secure conference call recording and playback, in accordance with one embodiment of the present invention

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of an entity or individual that interacts with an entity. The user may interact with the entity as a customer, such as a customer purchasing a product or service. Furthermore, as used herein the term "user device" or "mobile device" may refer to mobile phones, personal computing devices, tablet computers, wearable devices, and/or any portable electronic device capable of receiving and/or storing data therein. As used herein, an "authorized third party device" may be a user device belonging to a user who is not associated with the event conferencing platform or vendor systems, but has been granted access to a web portal, application, or other resource provided by the event conferencing platform or vender systems. In some embodiments, an authorized third party device may refer to a device that has been previously identified as used by an authorized user for accessing a conference call or web application.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

As used herein, the term "resource" may refer to physical currency, electronic data, or an exchangeable currency having a value (e.g., funds) or the like. A computing resource may refer to elements of one or more computing devices (e.g., processor, memory, communication device, and the like) networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison). As used herein, a "resource vehicle" may refer to any medium for resource conveyance from one resource location to another.

As used herein, an "interaction" or "connection" may refer to any communication between one or more users or systems within the system environment described herein. For example, an interaction may refer to a transfer or exchange of user information (e.g., data, information, passwords, PIN codes, and the like) between systems, devices, and/or application; an accessing of stored data by one or more devices; a transmission of a requested task; a sharing or leveraging of resources (e.g., computing resources) between device; or the like. An interaction may include user interactions with a user interface (e.g., clicking, swiping, text or data entry, and the like), authentication actions (e.g., signing-in, username and password entry, PIN code, and the like), account actions (e.g., account access, and the like) and the like. In a specific embodiment, an "interaction" may refer to a resource transfer executed between one or more users and/or entities (e.g., a transaction).

As used herein, the term "entity" may be used to include any business or vendor system that the platform may interact with to complete a secure conference call or call-related activity. The terms "financial institution" and "financial entity" may be used to include any organization that processes financial transactions including, but not limited to, banks, credit unions, savings and loan associations, investment companies, stock brokerages, insurance companies, and the like. In other embodiments, an entity may be a business, organization, a government organization or the like that is not a financial institution. In a specific embodiment, an entity is a resource providing entity such as a financial institution that provides a resource vehicle and/or service (e.g., finance associated account) to a user. The resource vehicle and/or location may include supplementary resources.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account or particular user device) and determine that the user has authority to access an account, conference call, or system. In some embodiments, the system may be owned or operated by an entity. In such embodiments, the entity may employ additional computer systems, such as authentication servers, to validate and certify resources inputted by the plurality of users within the system.

As used herein, "web portal" may refer to a secure web site or web-accessible interface provided by the event conferencing platform to users, authorized third parties, and vendor systems. In some embodiments, the web portal may be accessed via a provided user application on the user device or may be a secure web page accessible via a browser on a user device. In some embodiments, the web portal may used to display information from the application of the event conferencing platform, such as PIN codes, conference call information (e.g., conference call identification codes, time, date, description of call topic, and the like), recorded conference calls, user account information and the like. In specific embodiments, the web portal may be accessible only to users which have been granted access by an entity or a vendor, provided account information to the event conferencing platform, or set up an account with the event conferencing platform during an on-boarding process, and these specific users may be referred to as "on-boarded users."

FIG. 1 provides an integrated secure event conferencing system environment 200, in accordance with one embodiment of the present invention. FIG. 1 provides the system environment 200 for which the distributive network system with specialized data feeds associated with an interconnected resource distribution and retention network. FIG. 1 provides a unique system that includes specialized servers and system communicably linked across a distributive network of nodes required to perform the functions described herein.

As illustrated in FIG. 1, the authorized third party device 208 is operatively coupled, via a network 201 to the user device 204, PIN depository 205, vendor systems 207, and to the event conferencing platform 206. In this way, the authorized third party device 208 can send information to and receive information from the user device 204, vendor systems 207, and the event conferencing platform 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), public switched telephone network (PSTN), or any other type of network or combination of networks. The network 201 may provide for wireline, wireless, or a combination wireline and wireless communication between devices on the network 201.

In some embodiments, the user 202 is an individual or entity that has one or more user devices 204. The user 202 may be a customer of an entity. The user 202 may wish to complete a transaction with the entity. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the event conferencing platform 206, the authorized third party device 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the event conferencing platform 206.

As further illustrated in FIG. 1, the event conferencing platform 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the authorized third party device 208, the vendor systems 207, the PIN depository 205, and the user device 204. As such, the communication device 246 generally comprises a modem, server, or other device for communicating with other devices on the network 201.

As further illustrated in FIG. 1, the event conferencing platform 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the event conferencing platform 206 the memory device 250 stores an application 258. In one embodiment of the invention, the application 258 may associate with applications having computer-executable program code. Furthermore, the event conferencing platform 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more authorized third party device 208, vendor systems 207, PIN depository 205, and/or user device 204.

As illustrated in FIG. 1, the vendor systems 207 is connected to the authorized third party device 208, user device 204, PIN depository 205, and event conferencing platform 206. The vendor systems 207 has the same or similar components as described above with respect to the user device 204 and the event conferencing platform 206. While only one vendor systems 207 is illustrated in FIG. 1, it is understood that multiple vendor systems 207 may make up the system environment 200. The vendor systems 207 may be associated with one or more financial institutions, entities, or the like and function as a point-of-sale device or point-of-transaction device for the user to interact with in order to complete a transaction with the merchant.

In some embodiments, the vendor systems 207 is or includes an interactive computer terminal that is configured to initiate, perform, complete, and/or facilitate one or more transactions. The vendor systems 207 could be or include any device that a user may use to perform a transaction with an entity, such as, but not limited to, an ATM, a loyalty device such as a rewards card, loyalty card or other loyalty device, a magnetic-based payment device (e.g., a credit card, debit card, and the like), a personal identification number (PIN) payment device, a contactless payment device (e.g., a key fob), a radio frequency identification device (RFID) and the like, a computer, (e.g., a personal computer, tablet computer, desktop computer, server, laptop, and the like), a mobile device (e.g., a smartphone, cellular phone, personal digital assistant (PDA) device, MP3 device, personal GPS device, and the like), a merchant terminal, a self-service machine (e.g., vending machine, self-checkout machine, and the like), a public and/or business kiosk (e.g., an Internet kiosk, ticketing kiosk, bill pay kiosk, and the like), a gaming device, and/or various combinations of the foregoing.

In some embodiments, the vendor systems 207 is operated in a public place (e.g., on a street corner, at the doorstep of a private residence, in an open market, at a public rest stop, and the like). In other embodiments, the vendor systems 207 is additionally or alternatively operated in a place of business (e.g., in a retail store, post office, banking center, grocery store, factory floor, and the like). In accordance with some embodiments, the vendor systems 207 is not owned by the user of the resource acceptance device. Rather, in some embodiments, the vendor systems 207 is owned by a mobile business operator or a point-of-transaction operator (e.g., merchant, vendor, salesperson, and the like). In yet other embodiments, the vendor systems 207 is owned by the financial institution offering the resource acceptance device providing functionality in accordance with embodiments of the invention described herein.

As illustrated in FIG. 1, the PIN depository 205 is connected to the event conferencing platform 206. The PIN depository 205 has the same or similar components as described above with respect to the user device 204 and the event conferencing platform 206. While only one PIN depository 205 is illustrated in FIG. 1, it is understood that multiple PIN depository 205 may make up the system environment 200.

The PIN depository 205 stores generated PIN codes, user account information associated with on-boarded or authorized users, accounts associated with the users, accounts associated with the entity, and the like. In this way, the PIN depository 205 may store relevant information for generating secure conference call information and dynamically modifying secure conference call information and access information to call recordings for the event conferencing platform 206.

The PIN depository 205 may be connected to the event conferencing platform 206 via the network 201 for the event conferencing platform 206 to perform a search of the PIN depository 205 for identification of a specific program options, user auxiliary accumulation, and the like. Furthermore, the PIN depository 205 may communicate with the same network protocol and compatibility with the user device 204 for deployment of the PIN codes to the user 202.

As illustrated in FIG. 1, the authorized third party device 208 is connected to the vendor systems 207, user device 204, PIN depository 205, and event conferencing platform 206. In some embodiments, the authorized third party device 208 may be associated with the vendor systems 207. The authorized third party device 208 has the same or similar components as described above with respect to the user device 204 and the event conferencing platform 206. While only one authorized third party device 208 is illustrated in FIG. 1, it is understood that multiple authorized third party device 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The authorized third party device 208 may generally include a processing device communicably coupled to devices as a memory device, output devices, input devices, a network interface, a power source, one or more chips, and the like. The authorized third party device 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the authorized third party device 208 described herein.

FIG. 2A provides a high level process flow illustrating generation and allocation of single user PIN codes, in accordance with one embodiment of the present invention. As shown in FIG. 2A, the process flow begins whereby the event conferencing platform 206 receives a request to generate secure conference call information, as shown in block 102. In some embodiments, the request may be received from an entity that manages the event conferencing platform 206, while in other embodiments the request may be received from the vendor systems 207, or some third party that desires to organize a secure conference call. In some embodiments, the event conference platform 206 may be designed to respond to an application programming interface (API) call requesting the generation of secure conference call information. The API call may also contain information such as number of users, user account information, user authentication information, conference description (e.g., topics, time, and date), and the like to be used later by the event conference platform 206 to authenticate users, aggregate conference information, and provide access to conference call information.

In response to the request, the system generates a conference identification code and a conference-specific list of single user PIN codes for the secure conference, as shown in block 104. In some embodiments, the list of single user PIN codes is a list of many numeric or alphanumeric codes generated pseudo-randomly. In some embodiments, each list of single user PIN codes may contain five thousand or more separate single user PIN codes, each of which is generated for use by one single user at any given time. Additionally, the list of single user PIN codes is conference-specific, meaning that the single user PIN code is valid for one conference only, such that a separate single user PIN code will need to be generated for the same user to access a different conference. It is also understood that while the single user PIN codes are generated pseudo-randomly, the event conference platform 206 is designed to avoid repetition of single user codes between different conferences or over time. In some embodiments, the event conference platform 206 may be designed to exhaust all iterations of single user passcodes before repeating the use of a single user passcode iteration in a subsequent batch.

Next, as shown in block 106, the system may generate a link to a secure web portal for sharing secure conference call information. It is understood that the secure web portal may refer to a secure web site or web-accessible interface provided by the event conferencing platform 206 to users, authorized third parties, and vendor systems. In some embodiments, the web portal may be accessed via a provided user application 222 on the user device 204, or may be a secure web page accessible via a browser on the user device 204. In some embodiments, the web portal may be used to display information from the application of the event conferencing platform 206, such as PIN codes, conference call information (e.g., conference call dial-in number, conference identification code (ID), time, date, description of call topic, and the like), recorded conference calls, user account information and the like. In specific embodiments, the secure web portal may be accessible only to users which have been granted access by the entity or the vendor systems 207, to users who have provided account information to the event conferencing platform, or to users who have previously set up an account with the event conferencing platform during an on-boarding process, and these specific users may be referred to as "on-boarded users." In some embodiments, the on-boarding process may take place the first time the user attempts to access the secure web portal. For instance, the user may be prompted to provide contact information, create an alias or username, provide account information to verify that the user is associated with the vendor, or the entity, and the like. During the on-boarding process, the event conference platform 207 may identify device information of the user device 204 and retain this information for future reference when the user attempts to access a secure conference or recorded conference call. In some embodiments, such user devices that the event conference platform 207 has previously identified as being associated with on-boarded users may be considered authorized third party devices 208.

Once the link has been generated to the secure web portal, the link may be transmitted via network 201 to users, as shown in block 108. In some embodiments, the link may be transmitted to the user device 204 via email, text message, and the like such that the link will direct the user 204 to access the secure web portal and retrieve conference call information for a specific conference (e.g., conference call dial-in number, conference call ID, single user PIN code, conference call description, date, time, and the like). As shown in block 110, the system will receive a verification once an on-boarded user has accessed the secure web portal using the provided link. At this point, the system may assign a single user PIN code from the conference-specific list to the on-boarded user, as shown in block 112.

In some embodiments the system may have already been provided with user information for pre-verified users attending a specific conference call, and the system may pre-assign the single user PIN codes to specific users before sending the link to the secure web portal to the users. In other embodiments, the system may be alerted that one or more latent invitees for a specific conference call, and may use the conference ID generated for that specific conference call to access the list of single user PIN codes and further assign codes to the latent invitees. After the single user PIN codes have been assigned, the system may transmit and display the single user pin code to the user via the secure web portal, allowing the user to utilize the single user PIN code to call-in to the conference and access the conference call. In some embodiments, this display shown to the user may include other information such as a call-in number, conference ID, conference description, calendar invitation (e.g., a file formatted for interfacing with an email or calendaring application), a link to use post-call to access a call recording, and the like.

FIG. 2B provides a process flow illustrating conference call implementation utilizing single user PIN codes, in accordance with one embodiment of the present invention. As shown, the process in FIG. 2B is designed to follow the process as shown in FIG. 2A, as in indicated by the common process end "A" circle in both Figures. Based on the scheduled time and date, the event conference platform 206 is designed to initiate the secure conference call for which secure conference call information was provided to users, as shown in block 116. In some embodiments, the conference call may be programmed by the event conference platform 206 to begin automatically at a specific time, while in other embodiments the secure conference call may be triggered to initiate upon the dialing-in of a specific designated user, or "host," or by the dialing-in of any user authorized to access the secure conference call.

In some embodiments, a group of users may be designated a "host group" with added control over the aspects of the conference call. For instance, the system may be designed to allow the host group to communicate amongst themselves before the call is initiated for all users. In some embodiments, this may include creating a separate conference call "room" for the host group wherein the host group users may communicate, while the rest of the users authorized to access the conference call are connected to a separate "waiting room." When the conference call begins for all users, the two rooms may be merged or connected such that all users are allowed to communicate or listen to the conference call. Additionally, the host group users may have additional functionality or control over the conference call, such as the ability to mute and unmute specific users or groups of users connected to the conference call. In further embodiments, the host group may also have the ability to interact with an operator of the conference call in order to provide them specific information about the conference call.

Upon users dialing in to the secure conference using the provided dial-in number, the event conference platform 206 prompts users to enter the provided single user PIN code via their user device, as shown in block 118. In response to receiving the single user PIN code, the event conference platform 206 will verify that the single user PIN code is a valid PIN code for the secure conference, and connect the user to the secure conference call, as shown in block 120. In some embodiments, the event conference platform 206 may use additional information in addition to the single user PIN code to verify the user before connecting the user to the secure conference call, as indicated in block 120. For instance, the event conference system 206 may have stored user device information, such as phone number, IP address, device type, and the like, and may use this information to further resolve the user's identity and verify identity.

Finally, as shown in block 122, the event conference platform 206 is designed to continuously monitor the secure conference call to the ensure that no more than one user device is connected using each single user PIN code. The goal of this monitoring is to ensure that the single user PIN code may only be used by one user at any given time. As previously described, each single user PIN code is conference-specific to one conference ID; however, the event conference platform 206 is also designed to guard against simultaneous use of valid single user PIN codes by more than one individual. To this end, the event conference platform 206 will reject a single user PIN code if it has already been used to dial-in to the secure conference by a device that is currently connected to the secure conference. However, in some embodiments, the event conference platform 206 may recognize when a user device disconnects from the secure conference, and will reactivate the single user PIN code used to connect that particular device to the secure conference call. By "reactivating" the single user PIN code, the event conference platform 206 will allow the same user device to call back into the secure conference and reconnect.

In some embodiments, the event conference platform 206 may allow the reactivated single user PIN code to be used to call into the secure conference using a second device different from the original user device connected using the reactivated single user PIN code. For instance, the user may originally call-in to the secure conference using an office telephone, enter their single user PIN code to join the conference, and may later have to leave the office and reconnect to the secure conference from a separate device, such as a mobile device, voice over IP enabled computer, and the like. In this instance, the event conference platform 206 will recognize that the user has disconnected, reactivate the single user PIN code, and allow the user to call back and reconnect to the secure conference using the separate device.

In some embodiments, the separate devices used to reconnect to the secure conference may be required to be registered with the event conference platform 206, or pre-authorized by the vendor, host, entity, and the like prior to being authorized to use for reconnection. For instance, the user may have the option to add the phone number for their mobile device and office phone when creating an account with the event conference platform 206 or when being onboarded to the secure web portal. In other embodiments, the event conference platform 206 may recognize a new device being used to connect with a valid single user PIN code, and may automatically record associated device information as being associated with the particular user which was originally assigned that specific single user PIN code.

FIG. 3 provides a process flow illustrating delivery of single user PIN codes and conference access monitoring, in accordance with one embodiment of the present invention. As shown in block 302 of FIG. 3, the process flow beings whereby the event conferencing platform 206 generates batch of single user PIN codes and stores in PIN depository 205. In some embodiments, the batch of single user PIN codes may be any 'n' digit numeric or alphanumeric codes that are generated pseudo-randomly. The batch of single user PIN codes generated by the event conference platform 206 are non-repetitive.

As shown in block 304, the event conferencing platform 206 receives request for batch of single user PIN codes. The request may be associated with a specific conference call. In some embodiments, the request is raised by the vendor systems 207 via the secure web portal. In response to receiving the request, the system generates a conference call identification code for the conference call associated with the request. In some embodiments, the conference call associated with the request may be organized by a user associated with a vendor or an entity.

As shown in block 306, the event conferencing platform 206 links the unique batch of single user PIN codes to the conference call identification code. In response to receiving the request, the event conferencing platform 206 extracts unique batch of the single user PIN codes from the PIN depository 205 and links them with the conference call identification code. In some embodiments, the system generates the unique batch of single user PIN codes after receiving the request and links the generated unique batch of single user PIN codes with the conference call identification associated with the request. As shown in block 308, the event conferencing platform 206 transmits conference call identification code and batch of single user PIN codes to vendor system 207. In some embodiments, upon receiving the batch of single user PIN codes, the vendor systems 207 assign the batch of single user PIN codes to on-boarded users and transmit the user information associated with the on-boarded users to the event conferencing platform. For example, the vendor system 207 assigns a first single user PIN code to a first user and transmits information associated with the first user to the event conferencing platform 206. As shown in block 308, the event conferencing platform 206 receives user information from vendor system 207 as single user PIN codes are assigned to on-boarded users. In some embodiments, the user information may include, but is not limited to, user identification information, device identification information associated with the devices of the on-boarded users, and the like. The event conferencing platform 206 may track the users attending the conference call associated with the conference call identification code based on the user information received from the vendor system 207.

As shown in block 312, the event conferencing platform 206 initiates the conference call using the conference call identification code. For example, the system may automatically initiate the conference call at the scheduled time using the conference call identification code. In some embodiments, a first user may initiate the conference call using the conference call identification code, where the first user may be a user associated with the vendor system 207 that raised the request. After initiating the conference call, the event conferencing platform 206 receives single user pin code and user information from the users attending the conference call. The event conferencing platform 207 verifies that the single user PIN code and the user information match with the user information received from the vendor system 207 in block 310. This provides an additional layer of security to prevent unauthorized users or devices associated with the vendor from connecting to the conference call. In response to verifying, the event conferencing platform 207 grants user device access and deactivates the single user PIN code, as shown in block 316.

FIG. 4 provides a process flow illustrating secure conference call recording and playback, in accordance with one embodiment of the present invention. During the conference call, the event conferencing platform 206 records the conference call and after completion of the conference call, the event conferencing platform 206 stores the recording on event conferencing platform data storage as discussed in block 402. Next as shown in block 404, the event conferencing platform 206 generates a streaming link to remotely access the recording over network 201 and transmits the streaming link to on-boarded users that are associated with the conference call as shown in block 406. The streaming links directs the users to the secure web portal for streaming call recording. The event conferencing platform 206 identifies that a user is trying to gain access to the stream call recording using the streaming link and grants access to stream call recording via the secure web portal as shown in block 408. In some embodiments, where a user associated with the conference call uses the streaming link to access the recording, the event conferencing platform 206 authenticates the user based on the user device identification information before granting access to the recording in the secure web portal. In some embodiments, the event conferencing platform 206 may prompt the user to provide user credentials and single user PIN code to authenticate the user before granting access to the recording in the secure web portal.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secure remote conferencing, the system comprising:
   a memory device with computer-readable program code stored thereon;
   a communication device, wherein the communication device is configured to establish operative communication with a plurality of networked devices via a communication network;
   a processing device operatively coupled to the memory device and the communication device, wherein the processing device is configured to execute the computer-readable program code to:
      receive a request to generate secure conference call information for a secure conference call;
      generate the secure conference call information for the secure conference call, wherein the secure conference call information comprises a conference call identification code and a list of single user PIN codes associated with the conference call identification code;
      generate a link to a secure web portal and transmit the link to a user;
      verify that the user has accessed the secure web portal;
      upon verification that the user accessed the secure web portal, assign one single user PIN code from the list of single user PIN codes to the user; and
      display the assigned single user PIN code to the user via the secure web portal.

2. The system of claim 1, further configured to display additional information upon verification of the user via the secure web portal including conference call dial-in number conference call host, conference call time, conference call date, and conference call topic.

3. The system of claim 1, wherein the system is figured configured to:
   initiate the secure conference call;
   upon one or more users dialing-in to the secure conference call, prompt the one or more users to enter single user PIN codes via a user device;
   verify the entered single user PIN codes;
   connect the one or more users to the secure conference call;
   continuously monitor the one or more users connected to the secure conference call; and
   ensure that each single user PIN code is only used to connect one user at a time by rejecting simultaneous use of the same single user PIN code to connect multiple simultaneous users.

4. The system of claim 1, wherein a list of single user PIN codes associated with the conference call identification code are generated uniquely for the conference call identification code.

5. The system of claim 1, wherein the request to generate secure conference call information further comprises user information for one or more users authorized to access the secure conference call and the system is further configured to assign single user PIN codes from the list of single user PIN codes to specific users prior to generating the link to the secure web portal.

6. The system of claim 1, wherein the system is further configured to:
   grant a first user device access to the secure conference call upon receiving a first single user PIN code from the first user device;
   deactivate the first single user PIN code;
   continuously monitor all devices connected the secure conference call;
   determine that the first user device has disconnected from the secure conference call;
   reactivate the first single user PIN code; and
   subsequently grant a second user device access to the secure conference call upon receiving the first single user PIN code from the second user device after the first single user PIN code has been reactivated.

7. The system of claim 1, further configured to:
   generate a recording of the secure conference call;
   generate a streaming link for remote access to the recording of the secure conference call via the secure web portal; and
   automatically forward the streaming link to one or more users that received a single user PIN code.

8. A computer program product for secure remote conferencing, the computer program product comprising at least one non-transitory computer-readable medium having computer-readable program code portions embodied therein, the computer-readable program code portions comprising executable portion configured for:
   receiving a request to generate secure conference call information for a secure conference call;
   generating the secure conference call information for the secure conference call, wherein the secure conference call information comprises a conference call identification code and a list of single user PIN codes associated with the conference call identification code;
   generating a link to a secure web portal and transmit the link to a user;
   verifying that the user has accessed the secure web portal;
   upon verification that the user accessed the secure web portal, assigning one single user PIN code from the list of single user PIN codes to the user; and
   displaying the assigned single user PIN code to the user via the secure web portal.

9. The computer program product of claim 8, wherein the computer-readable program code portions comprising executable portion configured for displaying additional information upon verification of the user via the secure web portal including conference call dial-in number conference call host, conference call time, conference call date, and conference call topic.

10. The computer program product of claim 8, wherein the computer-readable program code portions comprising executable portion configured for:
    initiating the secure conference call;
    upon one or more users dialing-in to the secure conference call, prompting the one or more users to enter single user PIN codes via a user device;
    verifying the entered single user PIN codes;
    connecting the one or more users to the secure conference call;
    continuously monitoring the one or more users connected to the secure conference call; and
    ensuring that each single user PIN code is only used to connect one user at a time by rejecting simultaneous use of the same single user PIN code to connect multiple simultaneous users.

11. The computer program product of claim 8, wherein a list of single user PIN codes associated with the conference call identification code are generated uniquely for the conference call identification code.

12. The computer program product of claim 8, wherein the request to generate secure conference call information further comprises user information for one or more users authorized to access the secure conference call and the system is further configured to assign single user PIN codes from the list of single user PIN codes to specific users prior to generating the link to the secure web portal.

13. The computer program product of claim 8, wherein the computer-readable program code portions comprising executable portion configured for:
    granting a first user device access to the secure conference call upon receiving a first single user PIN code from the first user device;
    deactivating the first single user PIN code;
    continuously monitoring all devices connected the secure conference call;
    determining that the first user device has disconnected from the secure conference call;
    reactivating the first single user PIN code; and
    subsequently granting a second user device access to the secure conference call upon receiving the first single user PIN code from the second user device after the first single user PIN code has been reactivated.

14. The computer program product of claim 8, wherein the computer-readable program code portions comprising executable portion configured for:
    generating a recording of the secure conference call;
    generating a streaming link for remote access to the recording of the secure conference call via the secure web portal; and
    automatically forwarding the streaming link to one or more users that received a single user PIN code.

15. A computer-implemented method for secure remote conferencing, the method comprising:

receiving a request to generate secure conference call information for a secure conference call;

generating the secure conference call information for the secure conference call, wherein the secure conference call information comprises a conference call identification code and a list of single user PIN codes associated with the conference call identification code;

generating a link to a secure web portal and transmit the link to a user;

verifying that the user has accessed the secure web portal;

upon verification that the user accessed the secure web portal, assigning one single user PIN code from the list of single user PIN codes to the user; and displaying the assigned single user PIN code to the user via the secure web portal.

16. The computer-implemented method of claim 15, wherein the method further comprises displaying additional information upon verification of the user via the secure web portal including conference call dial-in number conference call host, conference call time, conference call date, and conference call topic.

17. The computer-implemented method of claim 15, wherein the method further comprises:
  initiating the secure conference call;
  upon one or more users dialing-in to the secure conference call, prompting the one or more users to enter single user PIN codes via a user device;
  verifying the entered single user PIN codes;
  connecting the one or more users to the secure conference call;
  continuously monitoring the one or more users connected to the secure conference call; and
  ensuring that each single user PIN code is only used to connect one user at a time by rejecting simultaneous use of the same single user PIN code to connect multiple simultaneous users.

18. The computer-implemented method of claim 15, wherein a list of single user PIN codes associated with the conference call identification code are generated uniquely for the conference call identification code.

19. The computer-implemented method of claim 15, wherein the request to generate secure conference call information further comprises user information for one or more users authorized to access the secure conference call and the system is further configured to assign single user PIN codes from the list of single user PIN codes to specific users prior to generating the link to the secure web portal.

20. The computer-implemented method of claim 15, wherein the method further comprises:
  granting a first user device access to the secure conference call upon receiving a first single user PIN code from the first user device;
  deactivating the first single user PIN code;
  continuously monitoring all devices connected the secure conference call;
  determining that the first user device has disconnected from the secure conference call;
  reactivating the first single user PIN code; and
  subsequently granting a second user device access to the secure conference call upon receiving the first single user PIN code from the second user device after the first single user PIN code has been reactivated.

* * * * *